United States Patent

[11] 3,590,666

| | | |
|---|---|---|
| [72] | Inventor | Adolf Langer<br>Munich, Germany |
| [21] | Appl. No. | 831,968 |
| [22] | Filed | June 10, 1969 |
| [45] | Patented | July 6, 1971 |
| [73] | Assignee | Pressluff-Stolzel OHG.<br>Nurnberg, Germany |
| [32] | Priority | June 14, 1968 |
| [33] | | Germany |
| [31] | | 17 65 588 |

[54] DEVICE FOR STRIPPING COAXIAL CABLE
7 Claims, 4 Drawing Figs.

[52] U.S. Cl. ................................................ 81/9.51,
30/90.1, 83/924
[51] Int. Cl. ............................................... H02g 1/12
[50] Field of Search ........................................ 30/90.1,
90.2; 81/9.5, 9.51; 82/46, 47, 60, 70.1, 83, 101;
83/401, 924

[56] References Cited
UNITED STATES PATENTS

| | | | |
|---|---|---|---|
| 1,679,977 | 8/1928 | Kundsen.................... | 82/70.1 |
| 2,268,820 | 11/1940 | Hannan..................... | 81/9.51 X |
| 3,429,211 | 2/1969 | Pelot........................ | 82/46 |
| 2,394,174 | 2/1946 | Hessler..................... | 81/9.51 |

*Primary Examiner*—Othell N. Simpson
*Assistant Examiner*—Michael Koczo, Jr.
*Attorney*—Hill, Sherman, Meroni, Gross & Simpson ABSTRACT: An apparatus for stepwise stripping or barring a coaxial cable generally comprises a base member supporting a bladeholder, a series of parallel, spaced cutting blades depending from the bladeholder at varying distances corresponding to requisite depths for stepwise severing of the cable, and means cooperating with the bladeholder and including a reciprocally moved plate for rolling a coaxial cable along the blades.

PATENTED JUL 6 1971

INVENTOR.
Adolf Langer
BY
Hill, Sherman, Meroni, Gross & Simpson
ATTYS.

3,590,666

DEVICE FOR STRIPPING COAXIAL CABLE

BACKGROUND OF THE INVENTION

1. Field of the Invention

This invention generally relates to wire-stripping devices, and more particularly refers to an apparatus for stepwise stripping or baring coaxial cables in a manner preventing damage to inner and outer conductors thereof.

2. Description of the Prior Art

Heretofore stripping or baring coaxial cables has been a very time-consuming activity requiring a high degree of skill on the part of the worker to avoid nicking or inadvertently severing portions of an outer conductor or an inner conductor of the cable. Even where a large series of coaxial cables having the same dimensions had been produced heretofore, the stripping or baring operation has almost exclusively been performed by manual operations utilizing stripping pincers or machines operating in the manner of circular saws or the like.

Cutting into or nicking the outer conductor a coaxial cable oftentimes utilized as a ground lead may be very harmful and require scrapping a section of the cable. In particular, where the outer conductor consists of a metal fabric of fine copper wires or the like, the danger of cutting into or severing the fabric outer conductor, or individual threads thereof, has been great when prior art stripping devices have been utilized.

SUMMARY OF THE INVENTION

In accordance with the principles of the present invention, an apparatus for stepwise stripping or baring coaxial cable generally comprises a base member, a bladeholder supported by end members on the base in a spaced relation thereto and mounting a series of depending, parallel, spaced cutting blades, and means cooperating with the bladeholder or carrier and including a reciprocally disposed plate for rolling a coaxial cable into cutting engagement with the blades, thereby to slice components of the cable in a manner enabling stepwise stripping thereof.

The blades are spaced relative to one another at spacings dependent upon the desired stepping of the cable, and the blades have cutting edges projecting from the bladeholder at varying distances corresponding to requisite cutting depths for slicing or incising components of the cable in a manner to form a steppedly bared cable.

For example, when used with a coaxial cable having a solid insulation between an inner conductor and an outer conductor consisting of a wire fabric and an outer insulating jacket, the series of blades include at least four cutting blades depending from the carrier and arranged so that a first blade only cuts into the outer insulating jacket and not directly up to the outer conductor, a second blade severs the outer conductor, a third blade only cuts into the insulator but not up to the inner conductor, and a fourth blade completely severs the cable and cuts through the inner conductor.

In order to facilitate peeling a cut or notched strip of the outer insulating jacket from the cable, the blade carrier may also include short blade sections disposed obliquely to the series of parallel blades and arranged to somewhat longitudinally notch the outer insulating jacket in an area between the first and second blades.

The apparatus, of course, may also be arranged to strip or bare coaxial cables of other configurations including cables having several outer conductor layers with interlying insulation layers or having spiral wound insulators disposed between inner and outer conductors. The number of blades may be arbitrarily selected according to the nature of the insulating layers and their number, and also, spacing between adjacent blades may be varied according to a desired stepping of the stripped cable.

It is also contemplated by the present invention to provide an automatic feeding device operating in conjunction with the stripping device to mass-produce stripped coaxial cable sections having equal lengths. In the event a user of the device of the present invention desires to produce equal-length cable sections having opposite ends thereof stripped, the blades then may be arranged in a symmetrical pattern to both slice the cable and notch or incise components thereof on opposite sides of the slice. With that arrangement, the automatic feeding device dispenses predetermined lengths of cable into the stripping device, and the device simultaneously strips a trailing end of a leading section and a leading end of a trailing section of cable.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure of my contribution to the art, and in which.

DETAILED DESCRIPTION OF THE PREFERRED EMBODIMENT

Figure 1:
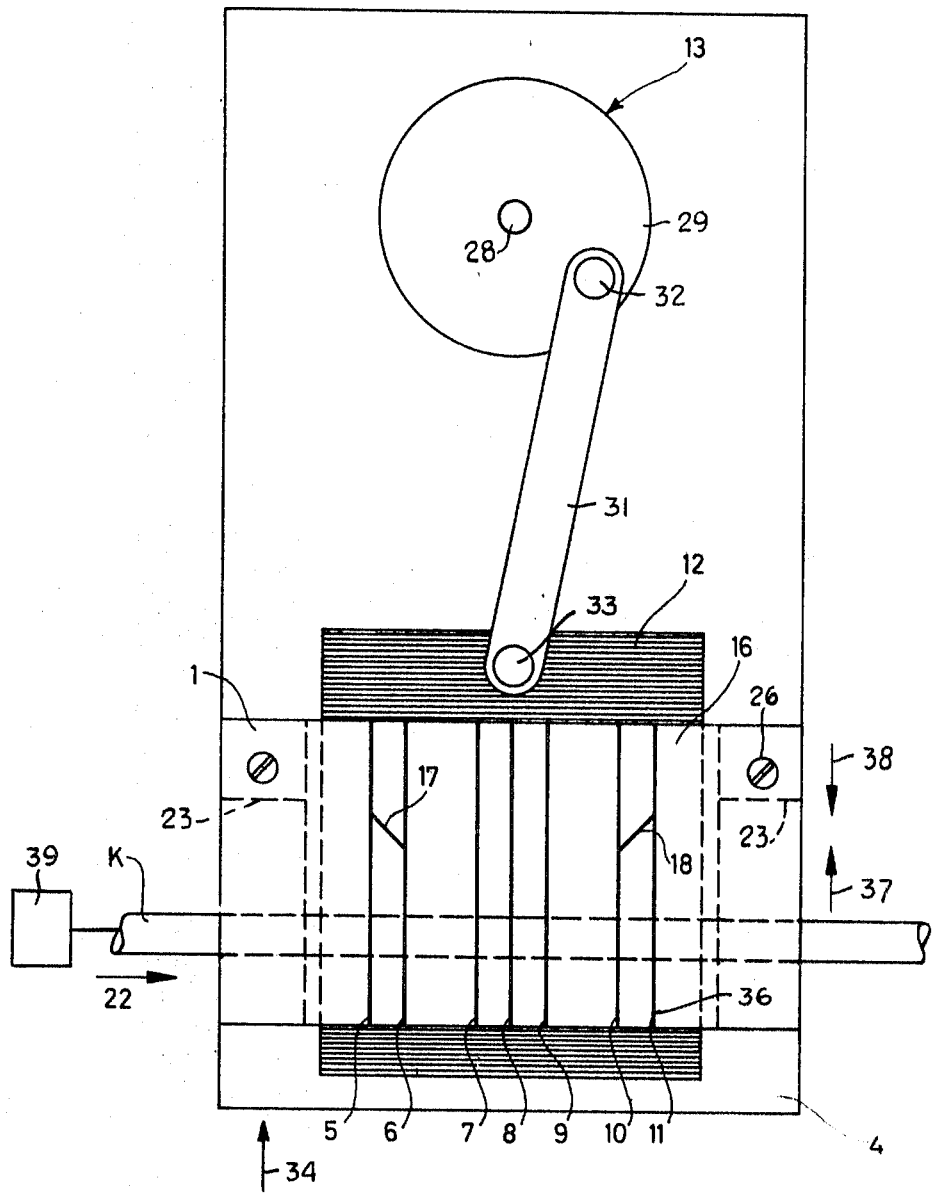
FIG. 1 is a top plan view illustrating a stripping device embodying the features of the present invention.
Figure 2:
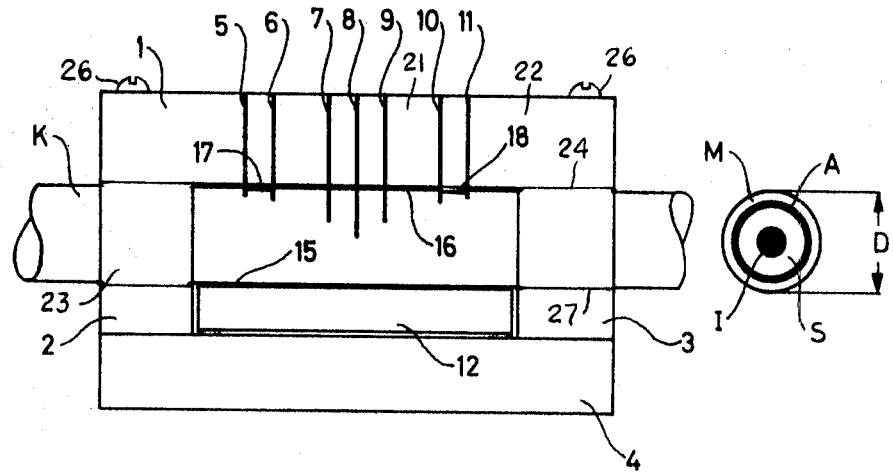
FIG. 2 is an end view of the device shown in FIG. 1 and illustrates a transverse cross section of a coaxial cable to be bared in relation to various cutting depths of cutting blades arranged in accordance with the principles of the present invention.

Referring to the drawings, a device for stepwise stripping of coaxial cable, constructed in accordance with the principles of the present invention, generally comprises a bladeholder or carrier 1 supported above a base 4 by a pair of support members 2 and 3, a plate member 12 and a drive means generally indicated at 13 for reciprocally propelling the plate.

Figure 4:
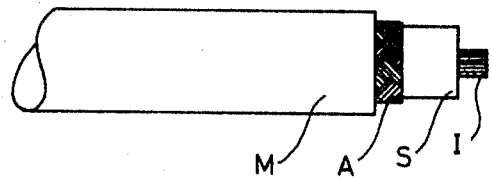
FIG. 4 is a partial side view of the coaxial cable of FIG. 3 and illustrates a resulting configuration of the cable subsequent to drawing off individual stepwise-incised cable sections.

A series of cutting blades 5 to 11, inclusive, are carried by the bladeholder 1 in a parallel, spaced arrangement with spacing therebetween corresponding to desired distances between steps of a stripped coaxial cable K, as illustrated in FIG. 4. The blades 5 to 11 may be attached to the bladeholder 1 by fastening means (not shown) passing through the blades and threading into flanges formed on the blade carrier or, the blades may be interlayered with spacing blocks as at 21 and end blocks as at 22, all of which are held together by suitable fastening means.

Each end support member 2 and 3 has a recess 23 opening at a front of the end support members and characterized by a vertical depth substantially equal to an outside diameter D of the cable K, thereby, with the blade carrier 1, defining a longitudinally extending slot for receiving the coaxial cable K in the direction indicated by arrow 34 and permitting the same to laterally move therewithin. The blade carrier 1 is interchangeably or removably supported on upper surfaces as at 24 of the end support members by means of fastening means such as screws 26.

Situated beneath the bladeholder 1 and intermediate the side supports 2 and 3 is the reciprocating plate member 12 having an upper surface 15 disposed coplanar with bottom wall surfaces as at 27 of the recesses 23 formed in the end support members, thereby enabling the upper surface 15 of the reciprocating plate 12 to drivingly engage a section of the coaxial cable K disposed within the stripping device. As illustrated in FIG. 1, the surface 15 of the reciprocating plate 12 is roughened or grooved to enhance gripping engagement between the plate and the cable. Also, an underneath surface 16 of the plateholder 1 may be roughened or grooved in areas intermediate the blades 5 to 11.

The drive means 13 for reciprocating the plate 12 along the base 4 in a direction longitudinally of the blades 5 to 11 comprise an electric motor (not shown) having a vertically disposed shaft 28 projecting upwardly through the base 4 and an eccentric drive interconnecting the motor shaft 28 and the plate 12 in a manner to convert rotational motion of the motor into reciprocative motion of the plate. In particular, the eccentric drive means include a disc member 29 mounted on the motor shaft 28 for corotation therewith and an arm member 31 having one end portion pinned or pivotally connected as at 32 at an eccentric location to the disc 29 and an opposite end pinned or pivotally connected as at 33 to the plate 12.

The cable K is introduced laterally as indicated by the arrow 34, and into a frontal area of a space between the blade carrier 1 and the plate 12. Since the spacing between the roughened surface 15 of the plate 12 and the underneath surface 16 of the blade carrier 1 is substantially equal to the outer diameter D of the coaxial cable K, reciprocative movement of the plate 12 laterally rolls the cable K longitudinally of the blades 5 to 11 and into cutting engagement therewith.

In order to enhance initiation of the cutting action and to facilitate slipping the cable K into the device, each of the cutting blades 5 to 11 has a longitudinally tapered edge as at 36 disposed in a frontal area of the space between the plate 12 and carrier 1 and tapering downwardly and rearwardly in a manner to provide a clear area through which the cable K may be introduced into the device.

Figure 3:
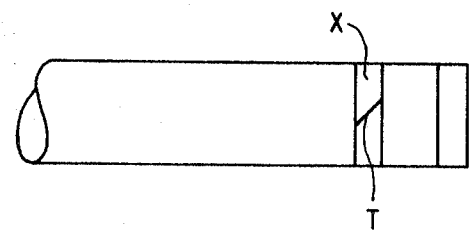
FIG. 3 is a partial side view of a coaxial cable and illustrates various notches or cuts formed therein by the stripping device of the present invention.

Subsequent to introducing the cable K into the device, an electric switch (not shown) is actuated to energize the electric motor driving the drive means 13 and thus propelling the plate 12 rearwardly as indicated by the arrow 37. Rearward movement of the plate 12 rolls the cable K in the same direction and into cutting engagement with the blades 5 to 11, thereby circumferentially slicing or incising the cable K at spaced planes and requisite depths, as illustrated in FIG. 3. Forward movement of the plate 12 in the direction indicated by arrow 38 rolls the cable K back to the frontal area, as illustrated in FIG. 1, to enable removal of the cable from the device. After a complete rearward and forward motion in the direction of the arrows 37 and 38, a forward edge of the reciprocating plate engages a pressure-sensitive switch (not shown) to stop the drive means motor.

If desired, the stripping or baring device of the present invention may be utilized in conjunction with a suitable automatic cable feeding or advancing device 39 feeding the cable K in the direction indicated by arrow 22. With that arrangement, the starting and stopping switches of the drive means motor are electrically connected through a control circuit with appropriate starting controls of the feeding device and adjustable stops or end switches controlling the advancing mechanism. The automatic advancing device advances a desired length of the cable K into the stripping device of the present invention, and then the drive means 13 is actuated to reciprocate the plate 12 through one complete back-and-forth stroke.

It is also contemplated by the present invention that for thin cables, a stroke of the reciprocating plate 12 less than a full back-and-forth movement may be provided by positioning adjustable end switches on the base 4 at locations to be engaged by ends of the plate and electrically connecting the switches to a control circuit for reversing polarity of the drive motor, and thus, reversing reciprocative motion of the plate 12.

The blades 5 to 11 may have various spacings and depths depending upon the type and configuration of coaxial cable to be sliced. Further, the blades may be arranged to stepwise slice or incise only one end segment of a cable or to simultaneously sever the cable and stepwise slice the cable on opposite sides of the severing plane. The latter arrangement is particularly advantageous where the device of the present invention is used in conjunction with an automatic feeding device, since a trailing edge of a leading length of cable is simultaneously, steppedly incised with a leading edge of a trailing length of the cable.

As illustrated in the drawings, the series of blades 5 to 11 may include blades arranged to steppedly slice or incise the coaxial cable K consisting of an inner conductor I, insulating material S surrounding the inner conductor, an outer conductor A composed of a fabric of fine, woven copper wire and an outer insulating jacket M. The outermost blades 5 and 11 depend from the underneath surface 16 of the blade carrier 1 only a sufficient distance to incise or notch the outer jacket M of the cable K without touching, scoring or engaging the fabric outer conductor A. The adjacently inwardly situated blades 6 and 10 project somewhat beneath the blades 5 and 11, but only to a sufficient depth to cut through the outer fabric conductor A. It is necessary to cleanly slice through the fabric outer conductor A, but it is desirable to avoid extensive notching of the insulator S by the blades 6 and 10.

In order to cut through the intermediate insulator S without damaging the inner conductor I, the blades 7 and 9 only project downwardly from the underneath surface 16 of the bladeholder 1 a sufficient depth to incise or deeply notch the insulator S but not cut completely therethrough. The middle blade 8 extends at least halfway through the cable K, and thus, completely cuts the inner conductor to sever the coaxial cable.

To facilitate peeling the outer jacket strip X, as illustrated in FIG. 3, formed by the pairs of blades 5, 6 or 10, 11, short blades 17 and 18 are somewhat transversely disposed between the pairs of blades 5, 6 and 10, 11, respectively. The transverse blades 17 and 18 extend somewhat obliquely as viewed from above (FIG. 1) and depend from the underneath surface 16 of the blade carrier 1 only a sufficient distance to notch the outer jacket M of the cable in a somewhat longitudinal direction thereof as at T, as illustrated in FIG. 3.

Since the outer jacket M and the insulator S are not completely cut through by the blades, individual ring portions or sections formed by the incisions must be withdrawn or pulled from the cable, thereby resulting in a desired stepped configuration, such as is illustrated in FIG. 4. If desired the ring section may remain on the cable to protect the conductors until the cable is to be utilized by an end user.

Although various minor modifications may be suggested by those versed in the art, it should be understood that I wish to embody within the scope of the patent warranted hereon all such modifications as reasonably and properly come within the scope of my contribution to the art.

I claim as my invention:

1. An apparatus for severing and stepwise stripping coaxial cables, comprising:
   means forming a base;
   means forming a bladeholder supported over a surface of said base;
   a series of parallel, spaced cutting blades carried in said bladeholder and extending toward said surface at varying distances corresponding to requisite cutting depths for stepwise stripping a coaxial cable in a manner to bare conductors thereof without damage to the same;
   means forming a plate member slidably supported on said base surface for reciprocal movement longitudinally of said blades and having a surface confronting said blades and spaced from a confronting surface of said bladeholder a distance approximately equal to an outside diameter of the coaxial cable to be sliced; and
   drive means reciprocally moving said plate longitudinally of said blades for rolling the cable into cutting engagement therewith.

2. An apparatus as defined in claim 1 and further characterized by said plate surface being roughened and said confronting surface on said plateholder being roughened in areas intermediate said blades.

3. An apparatus as defined in claim 1 wherein said drive means include:
   an eccentric having a member mounted for rotation and an arm having one end portion pivotally connected to said member at a point eccentric of an axis of rotation thereof and an opposite end portion pivotally connected to said plate; and motor means rotating said member to reciprocally drive said plate member.

4. An apparatus as defined in claim 1 and further characterized by switch means actuated upon completion of one back-and-forth reciprocal stroke of said plate for deenergizing said driving means.

5. An apparatus as defined in claim 1 and further characterized by means forming blades carried by said bladeholder and disposed in a manner to substantially longitudinally notch an outer covering jacket of the coaxial cable in an area adjacent a blade depending from the bladeholder only a sufficient distance to circumferentially notch the outer jacket.

6. An apparatus as defined in claim 1 and further characterized by said series of blades carried in said bladeholder being arranged and extending from said bladeholder in a manner to simultaneously sever the cable and stepwise incise the cable on opposite sides of a severing plane.

7. An apparatus as defined in claim 1 and further characterized by means for automatically advancing lengths of the cable laterally of the blades into a space between said bladeholder and said plate.